(12) United States Patent
Kirjavainen

(10) Patent No.: US 6,590,985 B1
(45) Date of Patent: Jul. 8, 2003

(54) METHOD AND ARRANGEMENT FOR DAMPING WALL MOVEMENT

(75) Inventor: Kari Kirjavainen, Espoo (FI)

(73) Assignee: Panphonics Oy, Tampere (FI)

(*) Notice: Subject to any disclaimer, the term of this patent is extended or adjusted under 35 U.S.C. 154(b) by 0 days.

(21) Appl. No.: 09/269,327

(22) PCT Filed: Oct. 3, 1997

(86) PCT No.: PCT/FI97/00598
§ 371 (c)(1),
(2), (4) Date: Mar. 24, 1999

(87) PCT Pub. No.: WO98/15944
PCT Pub. Date: Apr. 16, 1998

(30) Foreign Application Priority Data

Oct. 4, 1996 (FI) .................................................. 963988

(51) Int. Cl.⁷ .......................... A61F 11/06; G10K 11/16; H03B 29/00

(52) U.S. Cl. .................................... 381/71.2; 381/71.1

(58) Field of Search .............................. 381/71.2, 71.1, 381/71.7; 310/326, 328

(56) References Cited

U.S. PATENT DOCUMENTS

| 4,352,039 A | 9/1982 | Hagood et al. |
| 5,018,203 A | 5/1991 | Sawyers et al. |
| 5,719,945 A * | 2/1998 | Fuller et al. ................ 381/71.2 |

FOREIGN PATENT DOCUMENTS

| GB | 2019695 | 10/1979 |
| GB | 2091064 | 7/1982 |
| JP | 7210174 | 8/1995 |

OTHER PUBLICATIONS

International search report dated Feb. 2, 1998.

* cited by examiner

Primary Examiner—Ping Lee
(74) Attorney, Agent, or Firm—Marshall, Gerstein & Borun

(57) ABSTRACT

The invention relates to a method of and an arrangement for damping a wall movement. In the invention, the strength of an electric field between a surface of a wall and an air-permeable mass plate parallel with the surface is controlled to provide a force opposite to the wall-moving force. A sound wave, for instance, may cause a force moving a wall back and forth, which force is cancelled by the opposite force by means of the method and arrangement of the invention, whereby the movement applied to the wall by the sound wave can be stopped.

12 Claims, 2 Drawing Sheets

METHOD AND ARRANGEMENT FOR DAMPING WALL MOVEMENT

Figure 1:
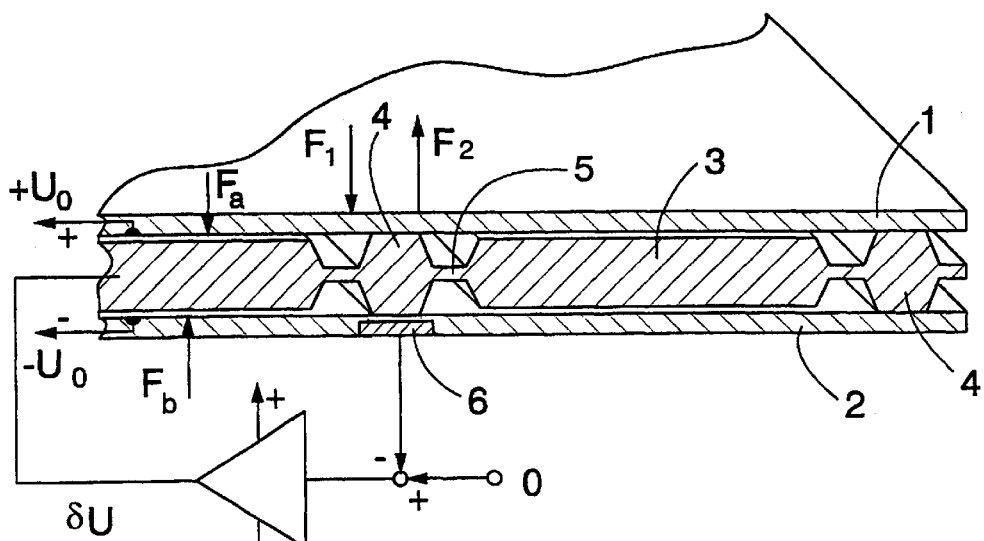

The invention relates to a method of damping a movement of a wall or a part of it, in which method the movement applied to the wall is measured and a counterforce is produced, which is opposite to the applied movement and substantially of the same size.

The invention relates further to an arrangement for damping a movement of a wall or a part of it, in which arrangement the movement applied to the wall is measured and a counterforce is produced, which is opposite to the applied movement and substantially of the same size.

Japanese Patent 07210174 discloses a noise insulating method, in which noise passing through a wall is damped. The wall acceleration caused by the noise applied to the wall is detected by sensors, and a braking force in the opposite direction is applied to the wall by an actuator to suppress the vibration detected by the sensors. However, said arrangement causes new acoustic vibration modes in the wall, which increases the stress on the wall structures.

U.S. Pat. No. 5,018,203 discloses an apparatus for attenuating noise, comprising a moving diaphragm, a movement of which, caused by noise, is measured and a countermovement is applied to the diaphragm electrically. The intention is to make the diaphragm immovable and to produce thus a noise attenuating structure. Such an air impermeable diaphragm generates sound, which is not appropriate for attenuating vibrations.

British Patent 2 091 064 discloses a solution, in which a counter-sound is generated by a window, whereby noise is prevented from entering the building through the window. In this solution, the windows constitute an electrostatic speaker generating countersound. Said solution is complicated and inconvenient and suitable for being used in connection with flexible structures only.

The object of the present invention is to provide a method and an arrangement by which a wall movement can be damped in a fairly simple and efficient manner.

The method according to the invention is characterised in that the counterforce is produced by means of an air-permeable mass plate, which is substantially parallel with a wall surface, by controlling the strength of an electric field between the wall surface and the mass plate by means of a signal obtained from the of the wall movement in order to move the mass plate.

Further, the arrangement according to the invention is characterised in that a means for producing the counterforce is constituted by an air-permeable mass plate, which is subsequently parallel with a wall surface, and that the arrangement comprises means for controlling the strength of an electric field between the wall surface and the mass plate by means of a signal obtained from the measurement of the wall movement.

An essential idea of the invention is that a wall movement is damped by means of an air-permeable mass plate, which is parallel with a wall surface, by controlling the strength of an electric field between the wall surface and the mass plate in order to provide a force opposite to the wall-moving force. The idea of a preferred embodiment is that the mass plate is manufactured of a porous material. The idea of a second preferred embodiment is that part of the mass plate is separated to generate a signal proportional to the acceleration. The idea of a third preferred embodiment is that the wall is constituted by at least two stator plates connected to each other and a mass plate between them.

An advantage of the invention is that no new vibration points are produced on the wall when a wall movement is damped by means of a mass plate. Because the mass plate is air-permeable, it does not cause any pressure fluctuation on its different sides, and therefore, it does not generate any sound wave, but only damps the vibration of the wall by the acceleration of its mass. The porous mass plate absorbs high sounds also passively and acts as a good electrical and mechanical protection, and in addition, a resonance of the movement is prevented thanks to flow losses generated in the porous material.

The invention is described in more detail in the attached drawings, where

Figure 2:
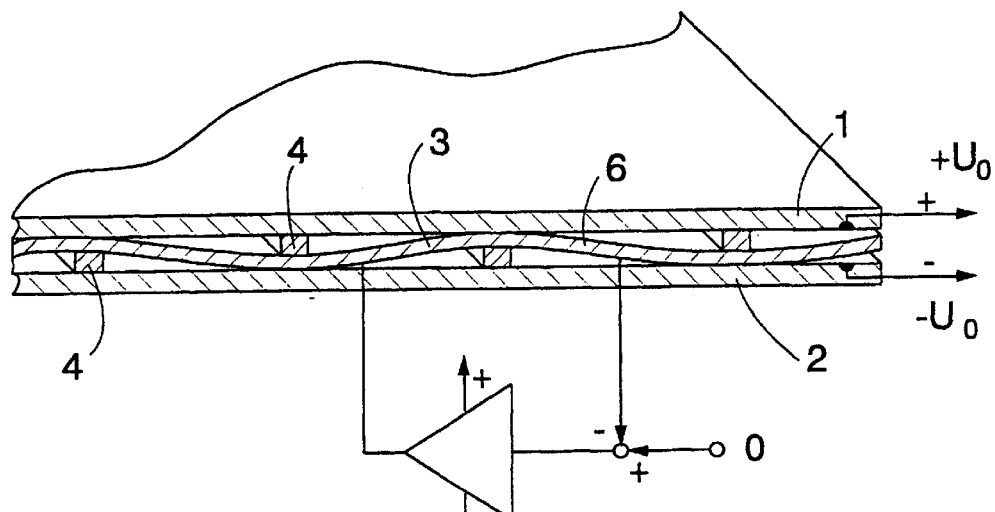
Figure 3:
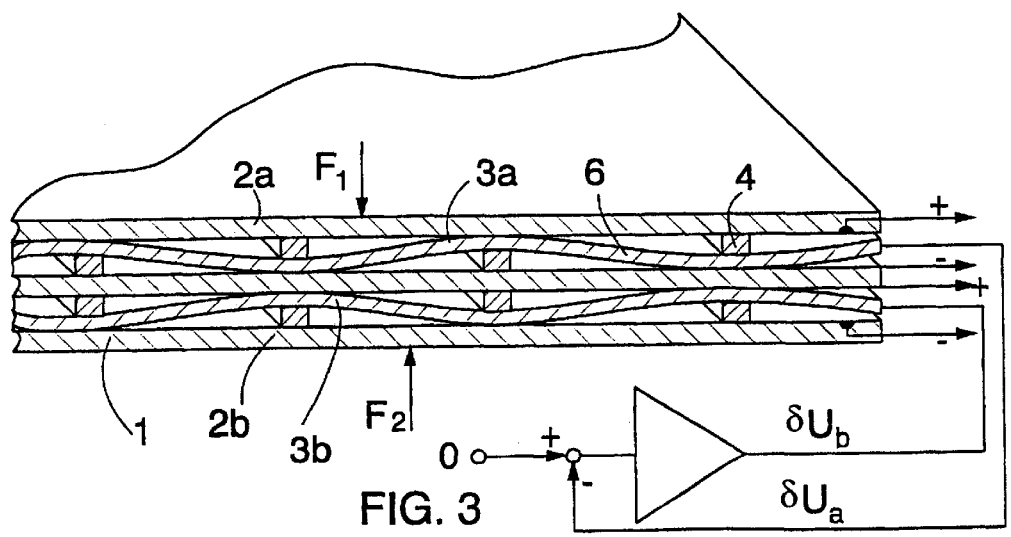
Figure 4:
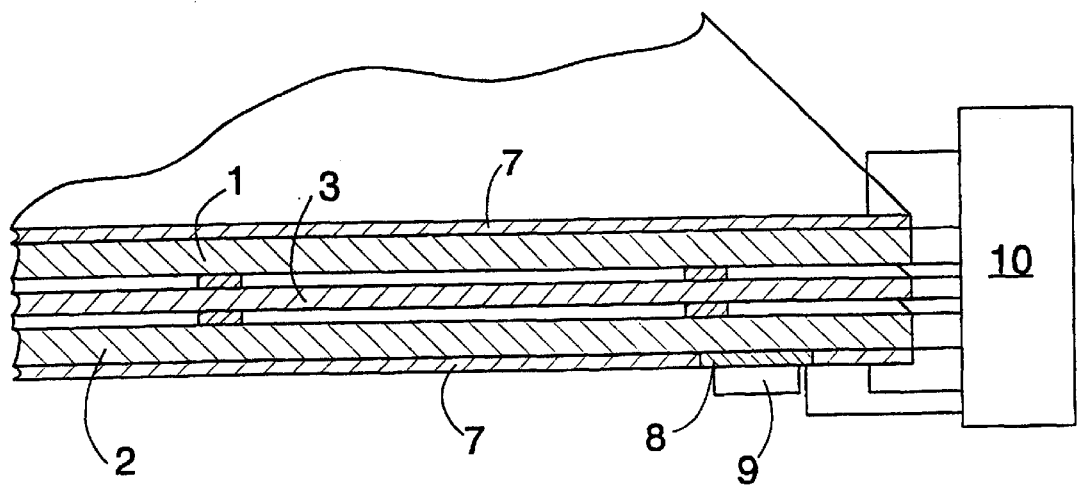
Figure 5:
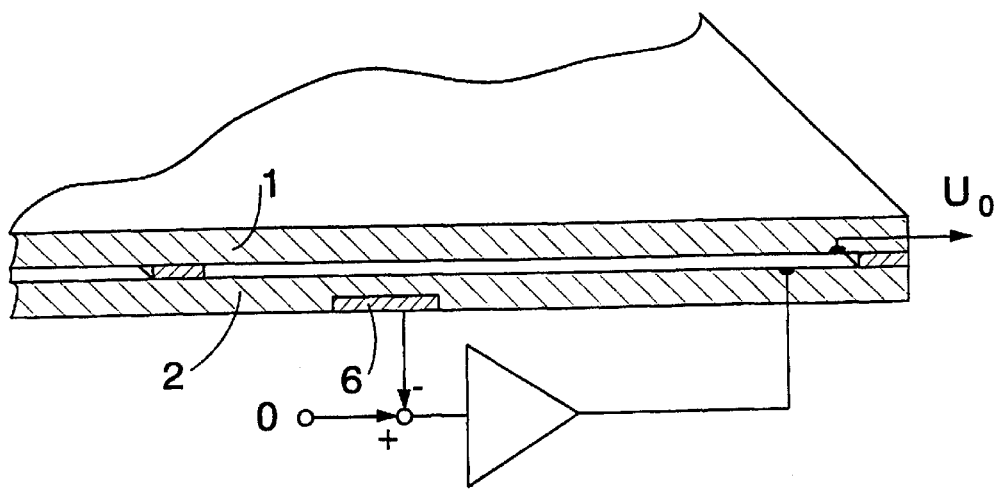
Figure 6:
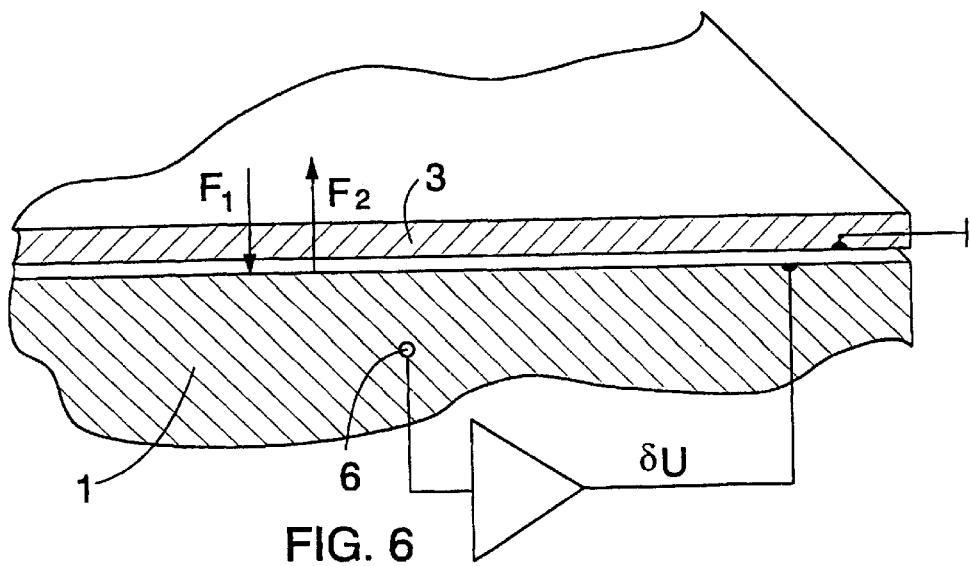

FIG. 1 shows schematically a solution according to the invention in cross-section, FIG. 2 shows schematically a second solution according to the invention in cross-section, FIG. 3 shows schematically a third solution according to the invention in cross-section, FIG. 4 shows schematically a fourth solution according to the invention in cross-section, FIG. 5 shows schematically a fifth solution according to the invention in cross-section, and FIG. 6 shows schematically a sixth solution according to the invention in cross-section.

FIG. 1 shows schematically a solution according to the invention. For instance, when the intention is to provide thin sound-insulating walls or walls for various casing applications, it should be possible to stop a movement applied to a wall by a sound wave. A sound wave applies to the wall a to-and-from moving force, which is cancelled by an opposite force by using the method and arrangement of the invention. The wall may be for example a partition, a ceiling, a floor or a part of any of them. In FIG. 1, the wall is constituted by stator plates 1 and 2, between which is positioned a moving mass plate 3. The acceleration caused by a wall-moving force $F_1$ to the stator plates 1 and 2 is measured by a sensor 6. Said signal, strongly amplified, is fed to control the movement of the moving mass plate 3. The mass plate 3 is influenced by forces $F_a$ and $F_b$ such that $$F_a = 1/2 \varepsilon A \frac{(U_0 - \Delta U)^2}{s_a^2}$$

and $$F_b = 1/2 \varepsilon A \frac{(U_0 + \Delta U)^2}{s_b^2}$$

where

∈ is dielectric constant of medium

A is area of mass plate 3

$U_0$ is biasing voltage $\Delta U$ is control voltage $s_a$ is distance between mass plate and first stator plate 1 and $s_b$ is distance between mass plate 3 and second stator plate 2.

The stator plates 1 and 2 are then influenced by a force $F_2$ such that $$F_2 = 2\varepsilon A \frac{U_0 \Delta U}{s^2},$$

where $s = s_a + s_b$. By feeding the signal measured from the acceleration of the stator plates 1 and 2, strongly amplified, to control the strength of an electric field between the wall surface and the mass plate 3 and thus a movement of the mass plate 3, it is possible to adjust the wall-moving force $F_1$ and the counterforce $F_2$ equal, whereby the wall stays in its place and does not let sound through. The counterforce $F_2$ is also adapted in such a way that $$F_2 = m*a,$$

where m is mass of mass plate 3 and a is acceleration of mass plate 3 of the same sign as measuring signal measured by sensor 6.

It is essential that the mass plate 3 is air-permeable in order not to generate pressure or sound waves on its different sides. The mass plate 3 is most preferably manufactured of a porous material, whereby the mass plate 3 absorbs high sounds also passively and acts as a good electrical and mechanical protection and resonances of movement are prevented. In order to transmit the movement of the mass as well as possible to the stator plates 1 and 2, the mass plate 3 is designed such that it has thinnings 5 and part of the mass plate 3 is formed into fastenings 4, by means of which the mass plate is attached to the stator plates 1 and 2.

As stator plates 1 and 2 can be used for instance metall plates, acoustic boards or any construction material, in principle; a concrete wall, for example, can serve as second stator plate. If a stator plate is not electrically conductive, it shall be coated with an electrically conductive material. The inner surface of the stator plates 1 and 2 shall preferably be coated with electret films, whereby no biasing voltage $U_0$ is needed. The moving mass plate 3 can be manufactured for example by sintering plastic powder, which is metallized on both sides, or the mass plate 3 can be coated with a perforated electret film having an electrically conductive layer on its inner surface.

FIG. 2 shows a structure in which a moving mass plate 3 is manufactured of a porous plate and fastened wavelike between stator plates 1 and 2. The surface of the plate is divided into electrically conductive areas such that at least one area constitutes an acceleration sensor 6, which makes the structure compact.

FIG. 3 shows a structure comprising three stator plates, whereby between a first stator plate 1 and a second stator plate 2a there is a first mass plate 3a constituting an acceleration sensor 6. A wall-moving force $F_1$ is compensated for by a second mass plate 3b, which is located between the first stator plate 1 and a third stator plate 2b and which produces a force $F_2$.

FIG. 4 shows an application in which the surface pressures directed to the wall are measured by pressure sensitive films 7. A pressure sensitive film 7 comprises an area 8 having a mass 9 thereon, which arrangement constitutes an acceleration sensor. The arrangement is controlled by an electronic unit 10.

FIG. 5 shows a simplified element comprising two porous stator plates 1 and the force between them is controlled for instance in order to zero a signal of a sensor 6 measuring the pressure. With respect to the above, either one of the stator plates 1 or 2 then analogously serves as a moving mass plate.

FIG. 6 shows a simple application of the invention, in which the surface of a stator plate 1 constituted by a compact wall structure primarily comprises an electrode layer, on which there is an insulation layer preferably of electret material, and on that again, there is at a short distance s a porous mass plate 3, the surface of the plate facing the stator plate 1 being electrically conductive. A signal obtained from an acceleration sensor 6 is fed, strongly amplified, over the conductive layers, whereby an electric field causes between said layers a force $F_2$ to cancel a wall-moving force $F_1$ and to prevent thus the wall from moving. The air gap s may also comprise a very thin and elastic layer. The function of the method can then be understood as an acceleration a of the same sign as the measuring signal 6 of the mass m of the mass plate. Acceleration a multiplied by the mass m of the mass plate 3 corresponds to the counterforce $F_2$.

The drawings and the relating description are only intended to illustrate the idea of the invention. As far as the details are concerned, the invention may vary within the scope of the claims.

What is claimed is:

1. Method of damping movement of a wall or a part of it in response to a force applied to the wall, the method comprising the steps of:

disposing an air-permeable mass plate substantially parallel to a surface of the wall;

measuring the force applied to the wall;

obtaining a signal from the measurement of the force applied to the wall;

using the signal to control the strength of an electric field between the wall surface and the mass plate; and using the electric field to produce a counterforce that is opposite to the force applied to the wall and substantially of the same size.

2. Method according to claim 1, wherein the mass plate is porous, whereby sounds are absorbed by means of the porous mass plate.

3. Method according to claim 1, wherein the force applied to the wall is measured by an acceleration sensor and the signal measured is amplified and fed to control the strength of the electric field between the wall surface and the mass plate.

4. Method according to claim 3, wherein a part of the mass plate is used as an acceleration sensor.

5. Method according to claim 1, wherein the wall comprises at least two stator plates on opposed sides of the mass plate.

6. An arrangement for damping a movement of a wall or a part of it in response to a force applied to the wall, in which the arrangement comprises:

means for measuring the force applied to the wall; and means for producing a counterforce that is opposite to the force applied to the wall and substantially of the same size, the means for producing the counterforce comprising an air-permeable mass plate that is substantially parallel with a surface of the wall, and means for using a signal obtained from the measuring means to control the strength of an electric field between the surface of the wall and the mass plate.

7. Arrangement according to claim 6, wherein the mass plate is made of a porous material.

8. Arrangement according to claim 6, wherein the arrangement comprises an acceleration sensor for measuring the acceleration of the wall.

9. Arrangement according to claim 8, wherein a part of the mass plate is arranged to constitute the acceleration sensor.

10. Arrangement according to claim 6, wherein the mass plate is bent to be gently wavelike.

11. An arrangement as recited in claim 6, in which the means for producing a counterforce does not generate a sound wave.

12. Method of damping a movement of a wall or a part of it, the method comprising the steps of:

disposing an air-permeable mass plate substantially parallel to a surface of the wall;

measuring a force applied to the wall;

obtaining a signal from the measurement of the force applied to the wall;

using the signal to control the strength of an electric field between the wall surface and the mass plate; and using the electric field to produce a counterforce that is opposite to the force applied to the wall and substantially of the same size, the counterforce being produced without generating a sound wave.

* * * * *